Figure 1:
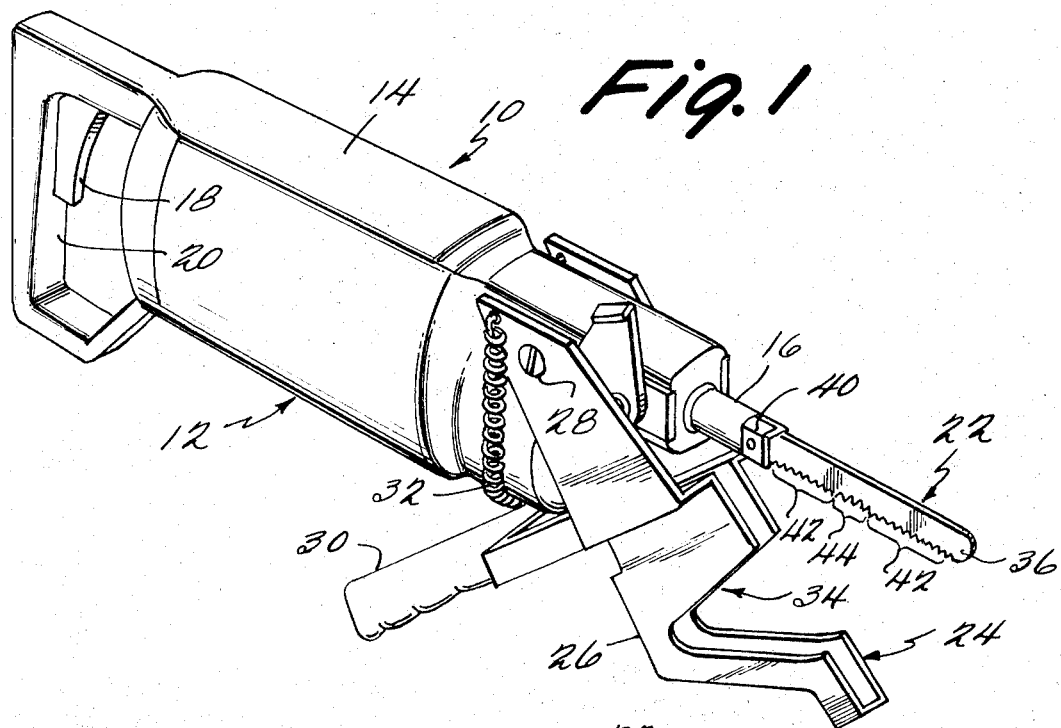

United States Patent [19]
McNally

[11] 3,805,383
[45] Apr. 23, 1974

[54] EXHAUST SYSTEM TUBE CUTTING APPARATUS WITH IMPROVED CUTTING EFFICIENCY

[75] Inventor: Sellers B. McNally, Barrington, Ill.
[73] Assignee: Maremount Corporation, Chicago, Ill.
[22] Filed: Nov. 22, 1972
[21] Appl. No.: 308,788

[52] U.S. Cl.................... 30/92, 30/378, 83/346
[51] Int. Cl................ B23d 21/00, B23d 49/06
[58] Field of Search............ 83/697, 846, 847, 851, 83/852; 30/92, 166 A, 392, 378, 393, 394

[56] References Cited
UNITED STATES PATENTS
29,688 8/1860 Germann............................ 83/846
2,568,870 9/1951 Ronan................................ 83/346 X FOREIGN PATENTS OR APPLICATIONS
741,168 2/1933 France............................ 83/846

Primary Examiner—Harold D. Whitehead
Assistant Examiner—J. C. Peters
Attorney, Agent, or Firm—Cushman, Darby & Cushman

[57] ABSTRACT

An improved cutting blade construction is disclosed for use with a power operated portable tool of the type including a housing having a blade receiving member mounted thereon for continuous reciprocating movement during the power operation of the tool and a structure for stably guiding an exhaust systems tube of any size within a predetermined range for relative movement through a cutting stroke with respect to the blade when the latter is attached to the tool during the power operation thereof, the improvement in the blade comprises a multiplicity of teeth of relatively fine size disposed in spaced end sections of the cutting edge of the blade and a plurality of teeth of relatively coarse size disposed in a central section of the edge between the end sections, the teeth in the end sections being of a sufficiently fine size to transversely engage and efficiently cut across the thickness of diametrically opposed portions of the tube wall of any tube within the range during the central intermediate cutting reciprocations of the blade during the cutting stroke thereof, the teeth of the central section being of a sufficiently coarse size to tangentially engage and efficiently cut the tube wall of any tube within the range during the initial and final cutting reciprocations of the blade during the cutting stroke.

13 Claims, 4 Drawing Figures

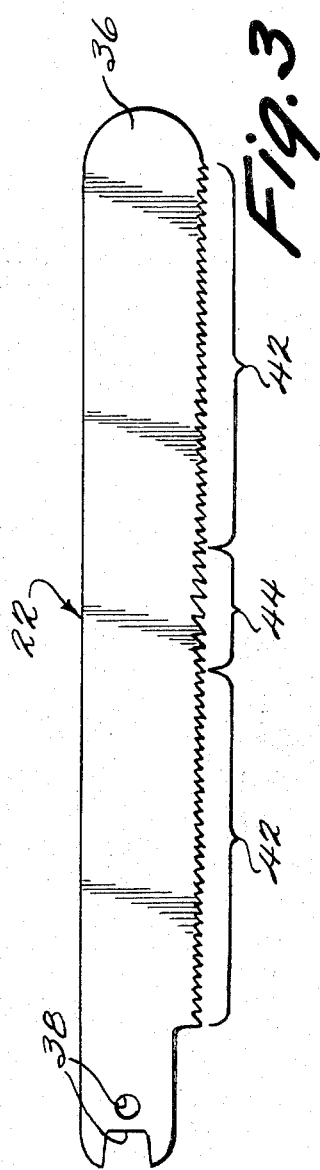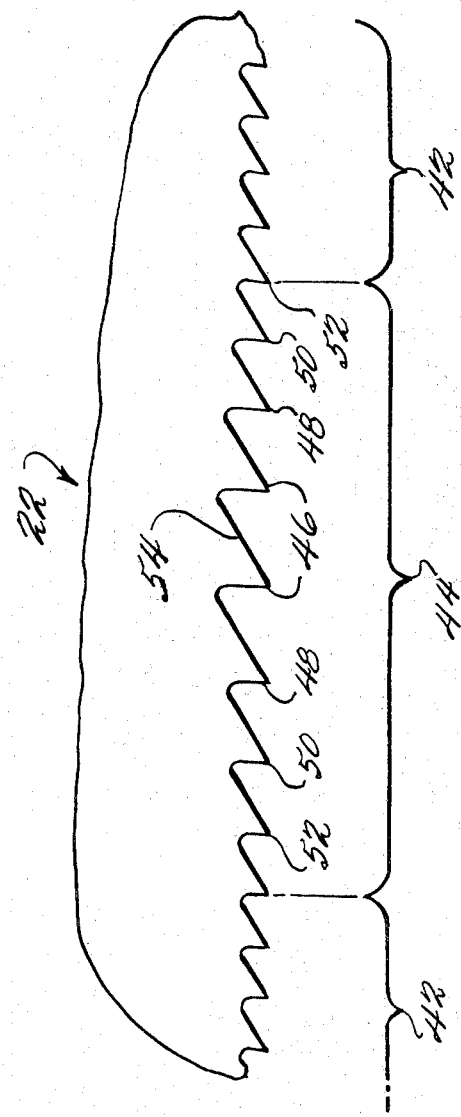

EXHAUST SYSTEM TUBE CUTTING APPARATUS WITH IMPROVED CUTTING EFFICIENCY

This invention relates to the cutting of exhaust system tubes and the like and more particularly to improvements in the cutting apparatus of the type disclosed in commonly-assigned application Ser. No. 308,785 filed Nov. 22, 1972, concurrently herewith in the name of Paul Smeltzer and David A. Daneck.

In the aforesaid application there is disclosed an apparatus for cutting exhaust system tubes of various diameter sizes which includes a conventional power operated portable tool of the type including a housing having a blade receiving member therein for continuous reciprocating movement during the power operation of the tool, a conventional elongated cutting blade of the sabre saw type and an attachment for the tool operable to receive a tube to be cut of any diameter size within a predetermined range and to stably guide the tube for movement through a cutting stroke with respect to the reciprocating blade to effect a transverse cut of the tube.

The present invention contemplates improvements in apparatus of this type which will enhance the effectiveness of the cutting action throughout the diameter size range of the tubes to be cut. In accordance with the principles of the present invention, this improved cutting effectiveness is achieved by forming the series of teeth of relatively small or fine size disposed in spaced end sections of the edge and a plurality of teeth of relatively large or coarse size disposed in a central section of the edge, which central section has a longitudinal dimension less than the interior diameter of the smallest tube in the range, and further, in so modifying the tube engaging surfaces of the structure for stably guiding a tube of any size within the range for relative movement with respect to the blade through the cutting stroke so as to insure (1) that the coarser teeth of the central section will tangentially engage and cut the wall of the tube during the initial and final cutting reciprocations of the blade during the cutting stroke and (2) that the finer teeth of the end sections transversely engage and cut across the thickness of diametrically opposed portions of the tube wall during the central intermediate cutting reciprocations of the blade during the cutting stroke.

With this arrangement, the cutting action is not only more effective but the useful life of the cutting blade is substantially extended in comparison with the utilization of conventional blades having a series of teeth all of the same size. It will be understood that the cutting action, irrespective of the particular size of the tube being cut, has certain common characteristics. As the cut first begins, the blade edge is riding nearly tangential to the surface of the tube. As the cut progresses through the tube, the actual width of the metal being cut decreases until at the tube diameter the saw is cutting transversely across the thickness of the walls at diametrically opposed portions thereof. From this point, as the cut progresses, the actual width of the metal being cut increases until at the very end, the cut is again substantially tangential to the surface of the tube.

These common variable characteristics, irrespective of tube diameter size, require sacrifice in cutting effectiveness when selecting a specific conventional blade to be used. On the one hand, where the conventional blade utilized has relatively coarse teeth, the initial and final cutting actions during the cutting stroke are performed quite acceptably and efficiently but, the cutting action during the central portion of the cutting stroke where the teeth are cutting across the thickness of two diametrically opposed tube wall portions is such as to tend to break and lose teeth. On the other hand, where the conventional blade utilized has fine teeth, the cutting action of the blade during the central intermediate portion of the cutting stroke across the thickness of diametrically opposed tube wall portions is performed quite effeciently and satisfactorily, but the initial and final tangential cutting actions tend to heat the blade rapidly and the teeth load up and become dull. By utilizing a variable pitch blade in accordance with the principles of the present invention and modifying the tube guiding structure so as to insure that any tube within the predetermined size range will move through its cutting stroke in a predetermined relation with respect to the variable pitched teeth of the blade, the advantageous and effective cutting actions of both fine and coarse teeth are obtained without the disadvantages thereof.

Accordingly, it is an object of the present invention to provide a cutting apparatus for exhaust system tubes of various diameter size within a predetermined range having improved means for increasing the effectiveness of the cutting function and extending the useful life of the cutting blade in accordance with the principles enunciated above so as to obtain the advantages set forth above.

Another object of the present invention is the provision of a reciprocating metal cutting blade of a particular variable tooth pitch construction specifically dimensioned to cut exhaust system tubes of a different diameter size within a predetermined range in which the cutting stroke is accomplished while the particular tube is stably guided in a predetermined relationship with respect to the cutting blade.

These and other objects of the present invention will become more apparent during the course of the following detailed description and appended claims.

The invention may best be understood with reference to the accompanying drawings wherein an illustrative embodiment is shown.

Figure 2:
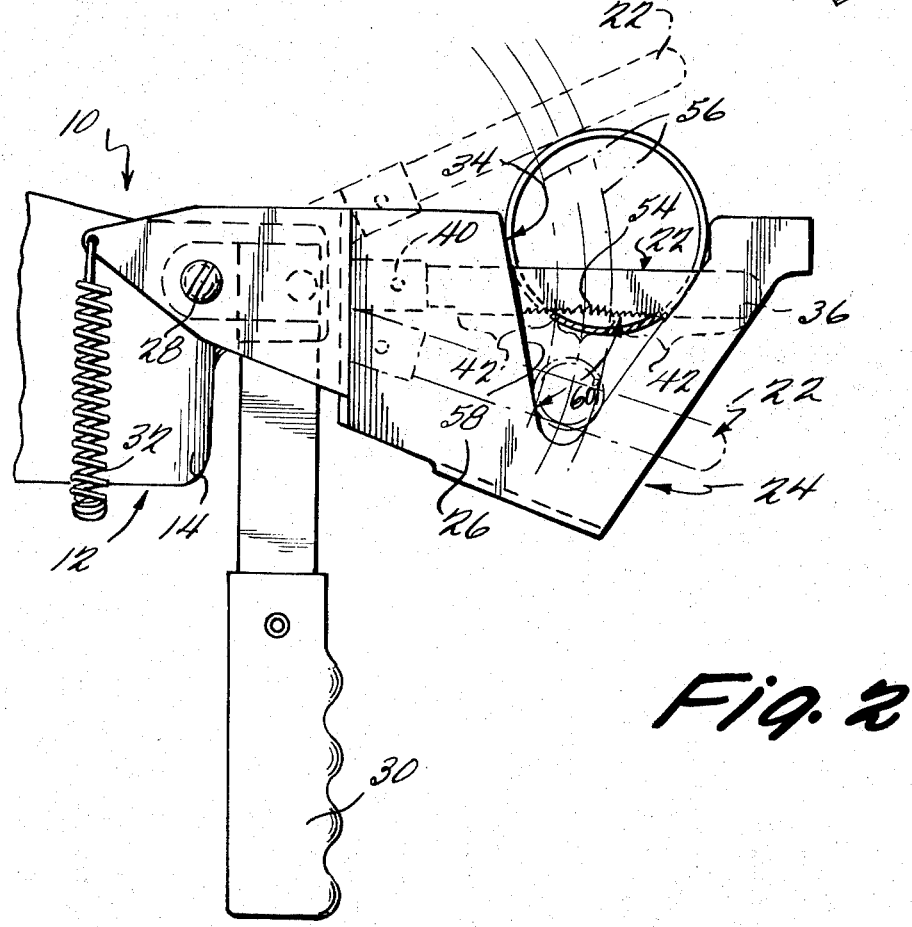

In the drawings:

FIG. 1 is a perspective view of an apparatus embodying the principles of the present invention;

FIG. 2 is a side elevational view of the apparatus, showing the cutting blade toward the end of its cutting stroke in cutting relation with a 2¾ inches diameter exhaust system tube, the relative position of the blade with respect to the tube at the beginning of the cutting stroke being shown in broken lines and the relationship of the blade with a 1 inch tube at the end of the cutting stroke therethrough being shown in phantom lines;

FIG. 3 is a side elevational view of the cutting blade of the present apparatus; and FIG. 4 is an enlarged fragmentary side elevational view of the central portion of the cutting blade.

Referring now more particularly to the drawings, there is shown in FIGS. 1 and 2 thereof an apparatus, generally indicated at 10, embodying the principles of the present invention. The apparatus includes a conventional power operated portable tool, generally indicated at 12, of the type including a housing 14 having a blade receiving member 16 mounted thereon for continuous reciprocating movement during the power operation of the tool As indicated, the tool 12 may be of any conventional construction, the drawings illustrating a tool manufactured by the Milwaukee Tool Company and merchandised under the trade name SAWZALL, Model No. 6505. It will be understood that the tool includes the usual electrical motor (not shown) within the housing 14 which, through the usual power transmission (not shown) serves to impart continuous reciprocating movement to the blade receiving member 16 in response to the engagement of an actuating trigger 18 by an operator grasping a handle 20 provided by housing 14.

The apparatus 10 also includes a cutting blade, generally indicated at 22, constructed in accordance with the principles of the present invention, and a tube guiding attachment, generally indicated at 24, which is preferably constructed in accordance with the disclosure of the aforesaid Smeltzer et al. application, except for certain modifications thereof in accordance with the principles of the present invention which will be hereinafter more fully described. A description of the detailed structure of the attachment 24 is contained in the aforesaid Smeltzer et al. application, which is hereby incorporated by reference into the present specification and is not believed necessary to an understanding of the present invention. For present purposes, it is sufficient to note that the attachment 24 includes a tube engaging structure 26 suitably mounted on the housing 14 of the tool 12 for pivotal movement, as by pivot pins 28, between a tube receiving position (shown in FIG. 1) and a cutting cycle completion position, a handle 30 fixed to the tube engaging structure into its tube receiving position, and a spring 32 connected between the tube engaging structure 26 and the housing 14 of the tool 12 for resiliently biasing the tube engaging structure into its cutting cycle completion position and for effecting movement of the tube engaging structure from the tube receiving position thereof, through a cutting stroke into the cutting cycle completion position thereof upon manual release of the handle with a tube disposed in operative relation with the tube engaging structure.

For purposes of receiving an exhaust systems tube of any size within a predetermined range as, for example, of the order of 1 inch to 2¾ inches, the tube engaging structure 26 is provided with recess means 34. In accordance with the principles of the present invention, this recess means 34 is shaped so as to stably guide any tube within the aforesaid predetermined size range through a cutting stroke in a predetermined relationship to the blade 22 which, in accordance with the principles of the present invention, is especially constructed to provide an efficient cutting action during the cutting stroke, irrespective of the particular size of the tube.

Referring now more particularly to FIGS. 3 and 4, the blade 22 is formed of an elongated strip of metal and includes a free end 36 and an opposite end provided with suitable openings 38 for connecting the blade to the blade receiving member 16 of the tool 12 by a conventional clip assembly 40 or the like (see FIG. 1). The blade 22 includes a cutting edge extending longitudinally between the ends 36 and 38 which is formed of a series of cutting teeth. These cutting teeth include a multiplicity of relatively fine cutting teeth formed in spaced end sections 42 of the cutting edge of the blade 22 and a plurality of relatively coarse teeth formed in a central section 44 of the cutting edge between the end sections 42 thereof. The relatively fine or small teeth of the sections 42 are of a size which will efficiently cut across the wall thickness of a thin tube such as embodied in conventional exhaust systems. The teeth in the central section 44 are of a size which will efficiently cut tangentially through the tube wall of any tube within the aforesaid predetermined size range.

The longitudinal extent of the central section 14 and the particular configuration of the coarse teeth therein, as well as the longitudinal size of the end sections 42 and the particular size of the teeth therein, are interrelated to the diameter sizes of the tubes within the predetermined range, particularly the medium diameter size (e.g. 1 inch), the tube wall thicknesses, particularly the minimum wall thickness (e.g. 0.057 inch), the predetermined relationship through which the tubes are moved during the cutting stroke by virtue of the pivotal action of the tube engaging structure and contour of the recess means 34 therein and the extent of the stroke of reciprocating movement of the blade receiving member (e.g. 0.750 inch). FIG. 4 illustrates a preferred configuration interrelated to each of these factors. The central section 44 includes two adjacent teeth 46 disposed in the central portion thereof which are of a coarse size of the order of 10 teeth per inch. These teeth, as well as all of the other teeth of the entire series on the blade 22 are of conventional shape adapted to cut in one direction of reciprocating movement and may be offset or waived in accordance with conventional practice, as desired. Disposed on each side of the two largest teeth 46 are three teeth 48, 50 and 52, of diminishing size, the teeth 48 having a size of the order of 12 teeth per inch, the teeth 50 having a size of the order of 14 teeth per inch and the teeth 52 having a size of the order of 16 teeth per inch. With this arrangement, the total longitudinal extent of the central section 44 is approximately 0.635 inch, which is less than the internal diameter (0.901 inch) of the smallest tube of the size range and less than the reciprocating stroke (0.750 inch) of the blade during operation. The teeth of each end section 42 are all of the same size in the preferred embodiment shown, the size being of the order of 18 teeth per inch. It will be noted that the size of these teeth (0.056 inch) is slightly less than the minimum wall thickness (0.057 inch) of the tubes within the predetermined range.

FIG. 2 graphically illustrates the relationships between the central section of the cutting edge of the blade, the diameter sizes of the tubes within the predetermined range, the movement of each tube with respect to the blade through the cutting stroke thereof and the reciprocating stroke of the blade. These relationships can be conveniently described with reference to a predetermined point on the cutting edge of the blade. Such a point, indicated at 54 in FIG. 4, is conveniently chosen as a point half way between the two largest teeth 46 of the central section 44. By following the movements of this point 54 with respect to the tube being cut during the cutting stroke, the relative position of cutting engagement of all of the cutting teeth with respect to the specific tube can be readily understood. The relative position changes as a function of essentially three interrelated factors; first, the reciprocating movement of the blade 22; second, the relative pivotal movement about axis 28 between the blade 22 and tube engaging structure 24; and third, the relative position of the tube with respect to the tube engaging structure by virtue of its particular diameter size within the predetermined range.

In FIG. 2, the blade 22 is shown in solid lines in a midposition of its reciprocating stroke. The first two factors; namely, the movement of the blade through its reciprocating stroke and the relative movement between the blade 22 and structure 26, will be the same irrespective of the particular tube being cut so that two arcs, indicated at 56 in FIG. 2, spaced equidistantly from the point 54 concentric with the pivotal axis 28 defines the area of movement of the point 54. The largest teeth 46 move within a similar area displaced on opposite sides of the arcs 56 a distance equal to the distance between these teeth and the point 54 and so forth for each of the teeth 48, 50 and 52 of the central section 44 as well as the teeth of the end sections 42.

The third factor; namely, the relative position of the tube within the recess means 34 of the tube engaging structure 26 involves a compromise between two desirable operational functions which are somewhat mutually exclusive. In order to accommodate different diameter size tubes within the range (1 inch to 2¾ inches) encountered in existing exhaust systems, the recess means 34 must have a shape which diverges in a direction outwardly toward the open end of the recess means. In the embodiment shown, the angle of divergence is approximately 45°. The compromise comes in choosing the exact position of the recess within the tube engaging structure. The two somewhat mutually exclusive operating functions are first, the need to have the area defined by the lines 56 fall within the interior of the tube so as to insure that the coarse teeth will engage and cut the tube wall tangentially and second, the need to maintain the recess-defining surfaces, indicated at 58 in FIG. 2, which face in a direction opposed to the direction of cut as nearly perpendicular to the cutting edge of the blade as possible to insure that the cutting action will properly proceed. However, as can be seen from the dotted and phantom line showings in FIG. 2, by virtue of the pivotal action of the structure 24, the angular position of the surfaces 58 with respect to the blade cutting edge changes as the tube engaging structure 24 moves from its tube receiving position to its cutting stroke completing position, the angularity measured from the blade cutting edge to the surfaces 58, indicated at 60 in FIG. 2, decreasing as the structure 24 approaches its cutting stroke completion position.

It will be noted, however, that as the angle 60 for any given position is increased, the area defined by the lines 56 is displaced away from its most desirable position which is essentially as near the middle of the recess means 34 as possible. In choosing the angle 60, the smallest diameter tube presents the most extreme variations in these two desirable functions. As can be seen from FIG. 2, the angle 60 between the blade and surfaces 58 at the end of the cutting stroke through a tube of 1 inch diameter is approximately 67½° and the arae defined by the lines 56 lies just within the interior of the tube. With this relationship, the largest teeth 46 will perform a major portion of the cutting action not only during the initial and final portions of the cutting stroke but during a substantial portion of the cutting stroke therebetween. The arrangement is such, however, that these two teeth will not engage the tube wall when the blade reaches the central position of the cutting stroke. The cutting action at this position will be substantially performed by the relatively fine teeth of the end sections 42, with the teeth 52 and 50 and possibly the teeth 48 coming into play somewhat. Moreover, the minimum 67½° angle of the surfaces 58 at the end of the cutting stroke is still sufficient to insure that the cutting action will proceed properly.

It will be noted that this relationship also insures an efficient cutting action with the largest diameter size tube shown in full lines in FIG. 2. In this case, the largest teeth 46, while performing the initial and final tangential cutting actions, quickly move out of cutting engagement and the fine teeth of the end sections 42 perform more of the cutting action through a greater part of the central portion of the cutting stroke. The most efficient cutting action will occur on an intermediate diameter size tube.

The important consideration is that the coarse teeth 46 at all times perform the tangential cutting at the beginning and end of the cutting stroke of each tube within the range, while the fine teeth of the end sections 42 at all times perform the cutting across the thickness of the tube wall of each tube within the range. It will be understood that the present invention contemplates in its broadest aspects any tube engaging structure which will accomplish this important consideration, the pivotal mounting and recess means of the structure 26 being greatly preferred because of its simplicity.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. In an apparatus for cutting through exhaust system tubes of various diameter sizes within a predetermined range of the type including a power operated portable tool of the type including a housing having a blade receiving member mounted therein for continuous reciprocating movement during the power operation of the tool, an elongated cutting blade including a free end, an opposite end attached to said blade receiving member, and a series of cutting teeth extending longitudinally along one end thereof between the ends thereof shaped to cut in response to reciprocating movement thereof in one direction, a tube engaging structure, means mounting said structure on said tool for movement with respect thereto between a tube receiving position and a cutting cycle completion position, manually engageable means for enabling an operator to manually effect movement of said structure into said tube receiving position, said structure providing tube receiving recess means therein open in a direction toward the cutting teeth and free end of said blade when said structure is moved into said tube receiving position by the manual movement of said manually engageable means a distance sufficient to enable the operator to position said structure in operative relation with a tube with the latter extending transversely between said recess means and the cutting teeth of said blade, said recess means being defined by longitudinally spaced surfaces which diverge in a direction in which the recess means open so as to be operable to receive therebetween and engage tubes of various diameter size, certain of said surfaces facing generally in a direction opposed to the direction of cut of the cutting teeth to resist movement of the tube in the direction of cutting movement when said cutting teeth are in cutting engagement therewith, and spring means are operatively connected with said structure and said housing for effecting a resilient biased movement of said structure from said tube receiving position through a cutting stroke into said cutting cycle completion position upon a manual release of said manually engageable means with a tube disposed in said operative relation between said recess means and said cutting blade so that the operative movement of said blade transversely cuts the tube during the aforesaid resiliently biased movement of said structure without engagement of said manually engageable means, the improvement therewith which comprises said series of teeth including a multiplicity of teeth of relatively fine size disposed in spaced end sections of said edge and a plurality of teeth of relatively coarse size disposed in a central section of said edge between said end sections, the teeth in said end sections being of a sufficiently fine size to transversely engage and efficiently cut across the thickness of diametrically opposed portions of the tube wall of any tube within said range during the central intermediate cutting reciprocations of said blade during the cutting stroke thereof, the teeth of said central section being of a sufficiently coarse size to tangentially engage and efficiently cut the tube wall of any tube within said range during the initial and final cutting reciprocations of the blade during said cutting stroke.

2. The improvement as defined in claim 1 wherein said certain surfaces are straight and disposed at an angle to said cutting edge which progressively changes during said cutting stroke, the minimum angle measured from said cutting edge to said surfaces being of the order of 67½° at the completion of the cutting stroke of the smallest tube in said range and the maximum angle being greater than 90° at the initiation of the cutting stroke of the largest tube in said range.

3. The improvements as defined in claim 2 wherein said range is of the order of 1 inch to 2¾ inches and said central section is of the order of 0.635 inches.

4. A cutting blade of the type having a free end, an opposite end, and a series of cutting teeth extending longitudinally along one edge thereof between the ends thereof shaped to cut in response to reciprocating movement thereof in one direction for use with a power operated portable tool of the type including a housing having a member adapted to be detachably fixedly secured to the opposite end of said blade mounted in said housing for continuous reciprocating movement during the power operation of the tool and means for stably guiding a tube of any size within a predetermined range for relative movement through a cutting stroke with respect to a blade when the latter is attached to the tool during the power operation thereof during which the axis of the tube is at all times transverse to the cutting edge of said blade, the improvement in said blade which comprises said series of teeth including a multiplicity of teeth of relatively fine size disposed in spaced end sections of said edge and a plurality of relatively coarse size disposed in a central section of said edge between said end sections, the teeth in said end sections being of a sufficiently fine size to transversely engage and efficiently cut across the thickness of diametrically opposed portions of the tube wall of any tube within said range during the central intermediate cutting reciprocations of said blade during the cutting stroke thereof, the teeth of said central section being of a sufficiently coarse size to tangentially engage and efficiently cut the tube wall of any tube within said range during the initial and final cutting reciprocations of the blade during said cutting stroke.

5. The improvement as defined in claim 4 wherein said central section includes at least two teeth of a size of the order of 10 teeth per inch.

6. The improvement as defined in claim 5 wherein said end sections include teeth of a size of the order of 18 teeth per inch.

7. The improvement as defined in claim 6 wherein said central section further includes three teeth of progressively diminishing size between each of said two teeth and the teeth of the adjacent end section.

8. The improvement as defined in claim 7 wherein said range is of the order of 1 inch to 2¾ inches and said central section is of the order of 0.635 inches.

9. For use with a power operated portable tool of the type including a housing having a blade receiving member mounted therein for continuous reciprocating movement during the power operation to the tool, the improvements which comprise an elongated cutting blade including a free end, an opposite end adapted to be attached to said blade receiving member, and a series of cutting teeth extending longitudinally along one edge thereof between the ends thereof shaped to cut exhaust systems tubes of different sizes within a predetermined range in response to reciprocating movement thereof in one direction, said series of teeth including a multiplicity of teeth of relatively fine size disposed in spaced end sections of said edge and a plurality of teeth of relatively coarse size disposed in a central section of said edge, the teeth in said end section being of a sufficiently fine size to efficiently cut across the thickness of the wall of a tube, the teeth of said central section being of a sufficiently coarse size to efficiently cut tangentially through the wall of a tube, and means for stably guiding a tube of any size within said range for relative movement through a cutting stroke with respect to said blade when the latter is attached to the tool during the power operation thereof, during which cutting stroke (1) the axis of said tube is at all times transverse to the longitudinal extent of said series of teeth, (2) the coarse teeth of said central section tangentially engage and cut the wall of the tube during the initial and final cutting reciprocations of the blade and (3) the fine teeth of said end sections transversely engage and cut across the thickness of diametrically opposes portions of the tube wall during the central intermediate cutting reciprocations of said blade.

10. The improvement as defined in claim 9 wherein said range is of the order of 1 inch to 2¾ inches and said central section is of the order of 0.635 inches.

11. The improvement as defined in claim 10 wherein said central section includes at least two teeth of a size of the order of 10 teeth per inch.

12. The improvement as defined in claim 11 wherein said end sections includes teeth of a size of the order of 18 teeth per inch.

13. The improvement as defined in claim 12 wherein said central section further includes three teeth of progressively diminishing size between each of said two teeth and the teeth of the adjacent end section.

* * * * *